United States Patent [19]
Isaacs

[11] Patent Number: 4,863,179
[45] Date of Patent: Sep. 5, 1989

[54] DUAL FUNCTION PALLET CARRIER-PLATFORM TRUCK FOR POSTAL AND PACKAGE DELIVERY SYSTEMS

[76] Inventor: Harold Isaacs, 2567 Lafayette Dr., University Heights, Ohio 44118

[21] Appl. No.: 222,371

[22] Filed: Jul. 18, 1988

Related U.S. Application Data

[63] Continuation of Ser. No. 879,151, Jun. 26, 1986, abandoned, which is a continuation-in-part of Ser. No. 732,845, May 10, 1985, abandoned.

[51] Int. Cl.$^4$ .............................................. B60R 27/00
[52] U.S. Cl. ............................... 280/33.996; 280/47.34; 280/79.11; 280/79.7; 280/408; 280/491.2
[58] Field of Search ................. 280/33.99 R, 33.99 H, 280/79.1 R, 79.3, 79.1 A, 47.34, 491 A, 482, 493, 494, 491 R, 491 D, 408, 491 E

[56] References Cited

U.S. PATENT DOCUMENTS

| | | | |
|---|---|---|---|
| 2,788,220 | 4/1957 | Christensen | 280/79.1 R |
| 2,968,491 | 1/1961 | Wilson | 280/79.1 R |
| 3,572,764 | 3/1971 | Rubin | 280/491 A |
| 3,782,746 | 1/1974 | Isaacs | 280/33.99 H |
| 4,222,579 | 9/1980 | Frydendal | 280/33.99 H |
| 4,354,604 | 10/1982 | Isaacs | 211/17 |
| 4,461,504 | 7/1984 | Perez et al. | 280/47.34 |

FOREIGN PATENT DOCUMENTS 1590951 6/1981 United Kingdom ........ 280/33.99 H Primary Examiner—Charles A. Marmor
Assistant Examiner—Eric Culbreth
Attorney, Agent, or Firm—Tarolli, Sundheim & Covell

[57] ABSTRACT

A unique versatile high-speed material handling system is provided for the postal service using specially designed pallet-platform trucks to minimize the cost of transport to and from bulk mail centers and to speed-up the processing and delivery of mail. Each bulk mail center is provided with a multiplicity of compact nestable four-wheel dual-function trucks with a flat retractable shelf of a size to receive a standard-size pallet and with a removable vertical rear end frame which is stored on the permanent vertical front end frame. The specially designed trucks function in one mode with both end frames as platform trucks to carry mail sacks and in another mode with only one end frame as pallet carriers to carry pelletized loads. They are able to track effectively when pulled around sharp corners and through narrow aisles in trains of 3 to 8 trucks. The unique delivery system eliminates the inefficiency of crude pallet systems using pallet jacks and permits rapid loading and unloading of the 40-foot truck trailers used for external transport from one bulk mail center to another and more effective use of space in the trailers.

6 Claims, 11 Drawing Sheets

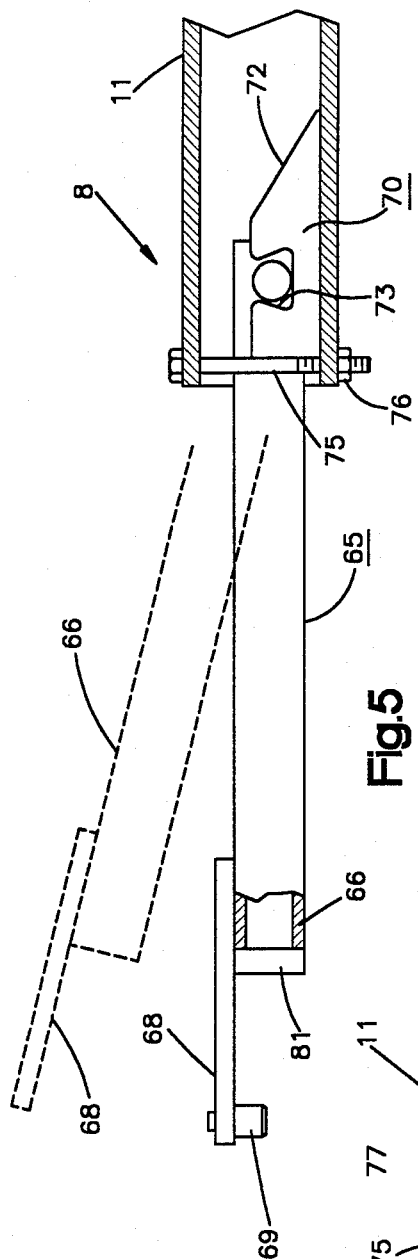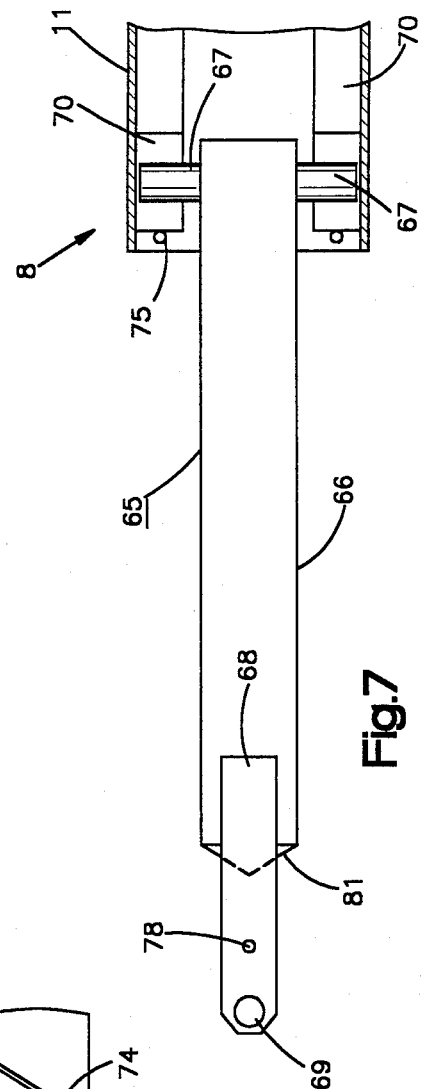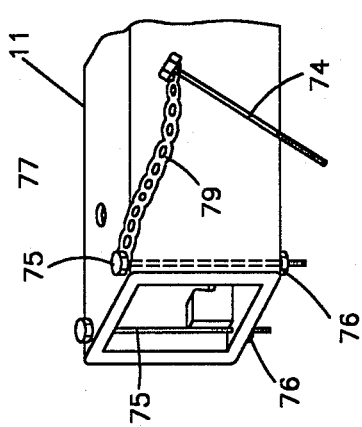

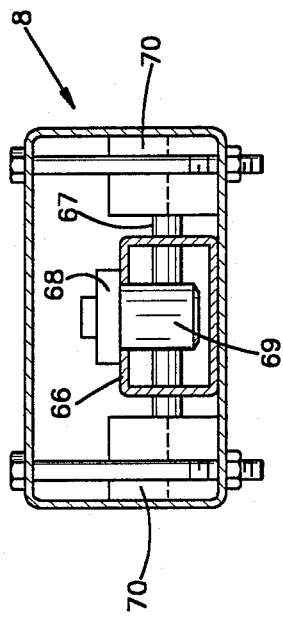
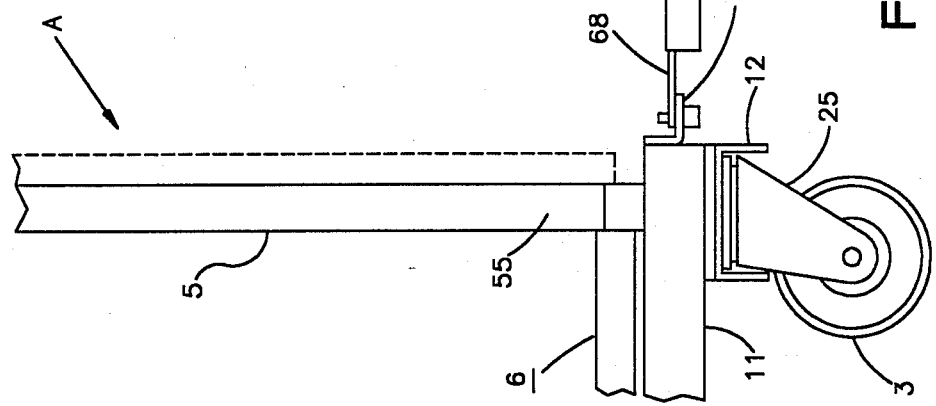
Fig.8
Fig.9

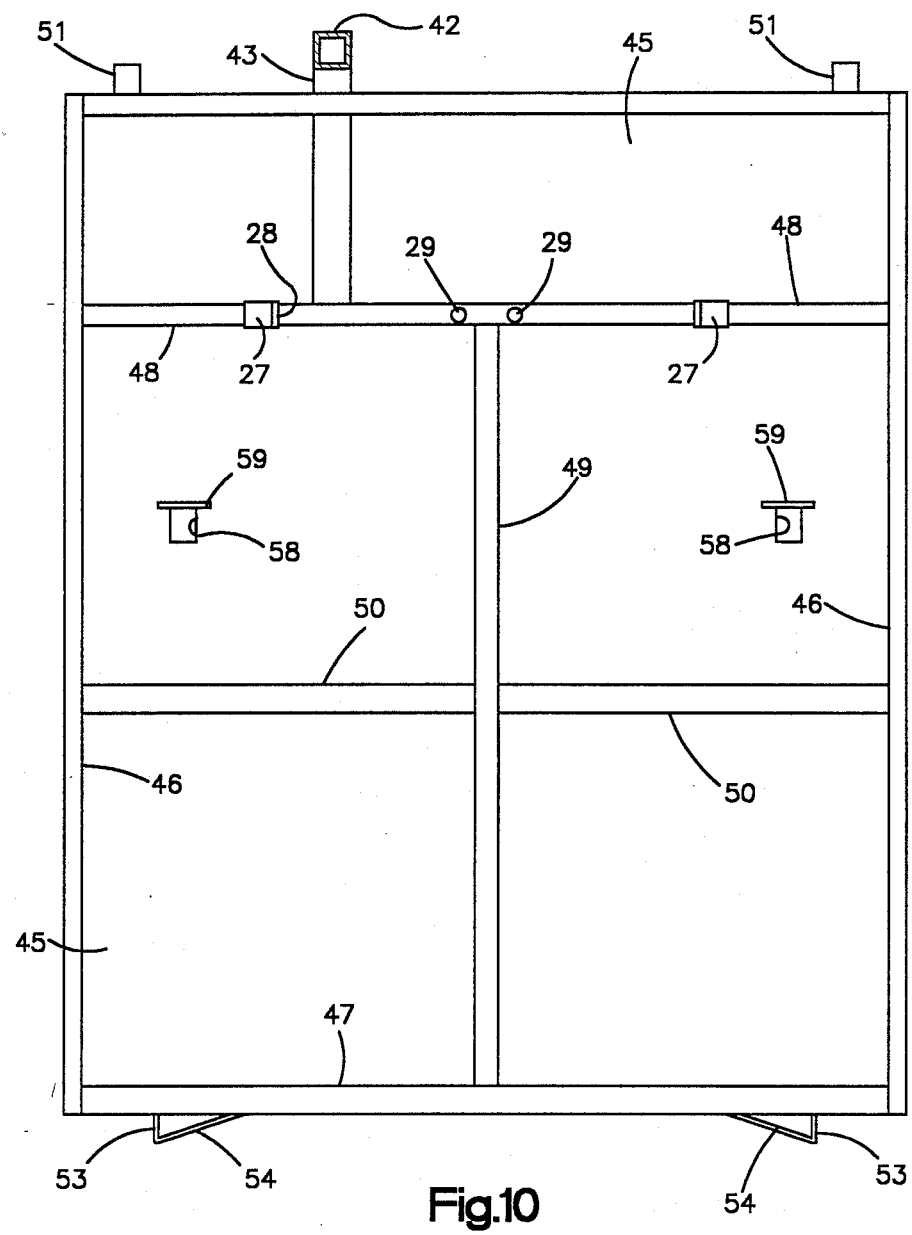

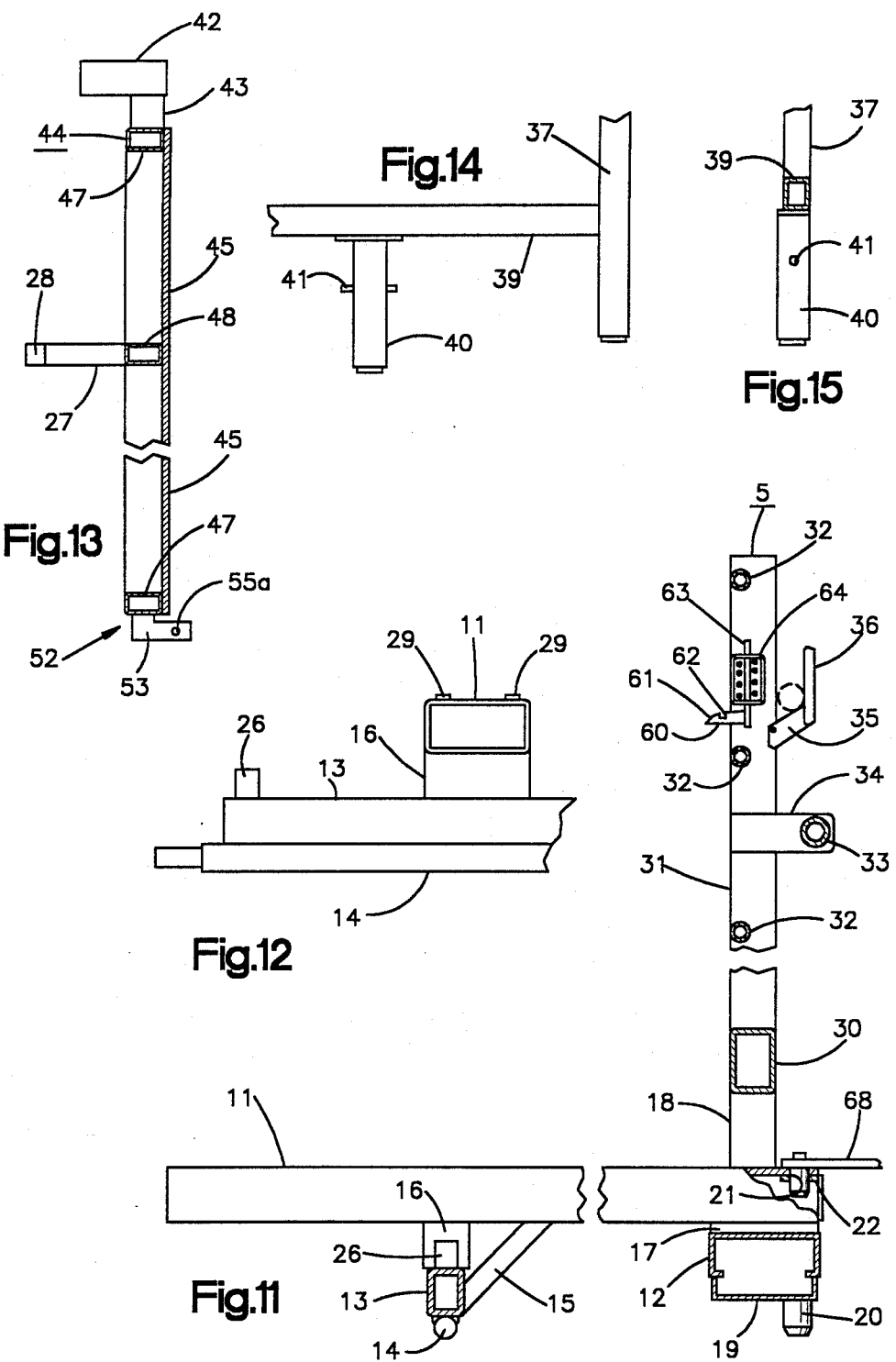

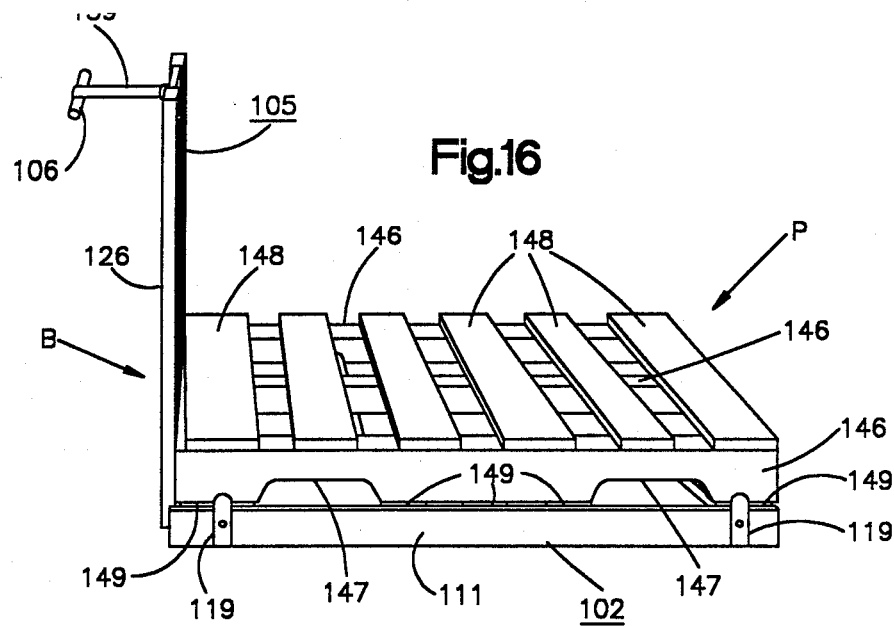
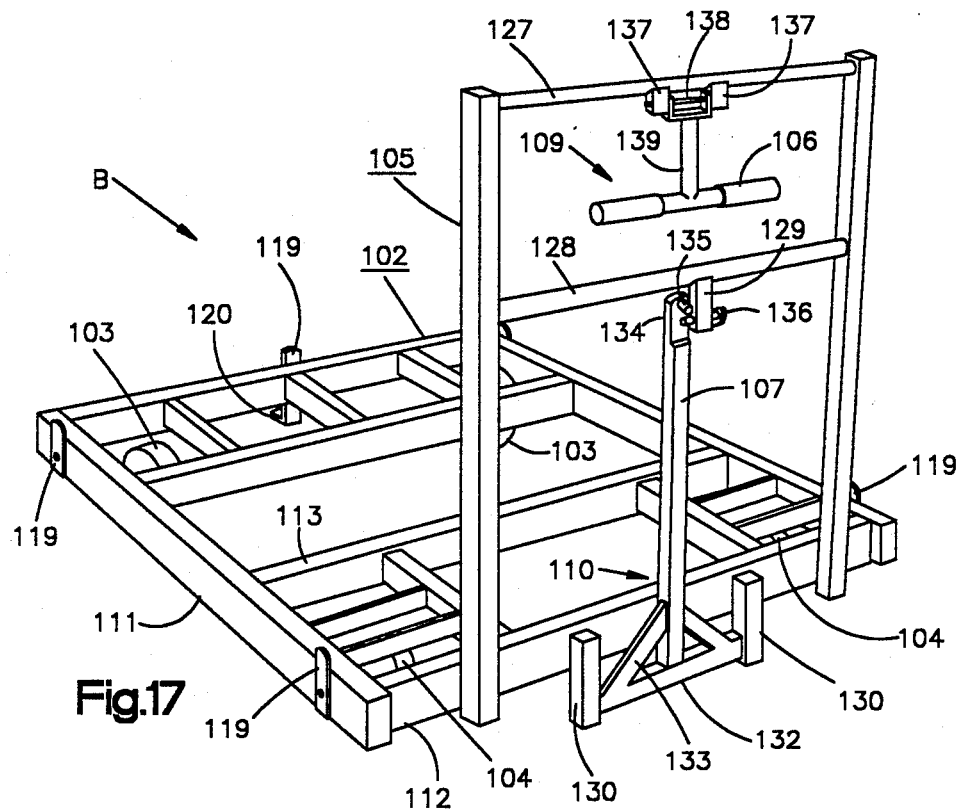

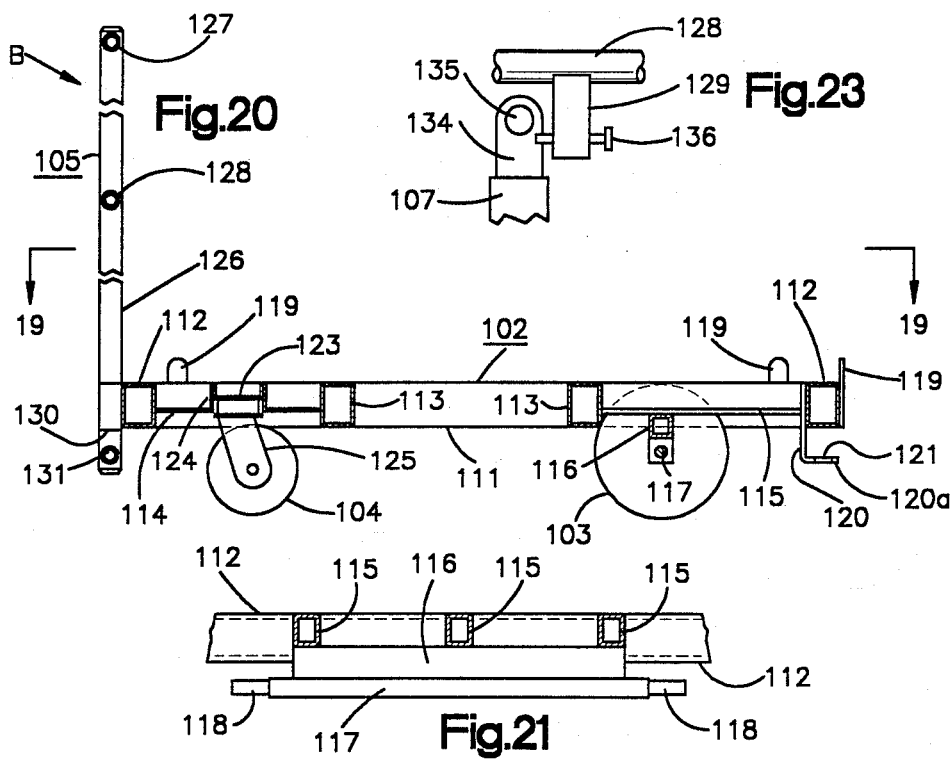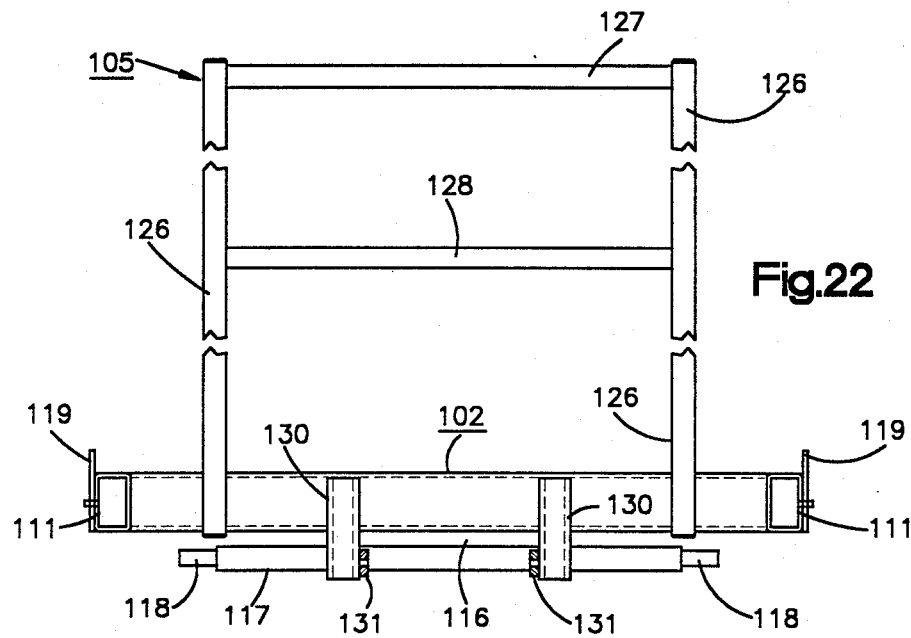

DUAL FUNCTION PALLET CARRIER-PLATFORM TRUCK FOR POSTAL AND PACKAGE DELIVERY SYSTEMS

This is a continuation of co-pending applicaton Ser. No. 879,151 filed on June 26, 1986 which is a continuation-in-part of application Ser. No. 732,845 filed May 10, 1985 both now abandoned.

The present invention relates to a special high-speed material loading system that employs special compact nestable four-wheel trucks or carts for efficient processing and transport of palletized goods, merchanidse or mail and more particularly to a unique combination platform truck pallet carrier which provides a simple solution to major problems in postal and package delivery systems and in warehousing systems.

BACKGROUND OF THE INVENTION

For several decades the standard material handling systems have employed inexpensive wooden pallets for shipping and warehousing. In such systems the merchandise is palletized at the point of manufacture and delivered to and from the depot or warehouse on wooden pallets using various means to facilitate lifting and transport of the palletized loads including fork lift trucks, pallet jacks, platform trucks and the like.

In a typical material handling system for a mercantile establishment, the boxes or cases containing the merchandise, which are stacked on wooden pallets, are transported in a large truck trailer using a pallet jack to load and unload the trailer. Fork lift trucks or other types of unit load lifters are employed during unloading. In those establishments having a suitable loading dock, a pallet jack is sufficient for the unloading operation.

Pallets have also been used by many large corporations for delivery of advertising material and other goods to bulk mail centers of the U.S. Postal Services. In general the pallet delivery methods employed by the postal system have heretofore been slow and inefficient.

Typical pallet delivery systems used by ordinary mercantile establishments suffer from similar deficiencies. Nevertheless pallet delivery systems of the type mentioned above have for decades been popular and have been considered practical and well suited for transport of goods and merchandise from a depot or warehouse to a retail establishment, such as a supermarket or department store. These pallet systems are in fact slow, inefficient and uneconomical, particularly because of the costs involved in providing storage space at the retail store and in storing the palletized merchanidse until it can be depalletized, sorted, marked and delivered to the retail shelves.

During the last decade, progress has been made in reducing material handling costs at mercantile establishments, but basic problems associated with the pallet systems remained unsolved. For example, some retail stores reduce labor costs by use of special stock systems which facilitate back room processing and shelf stocking. Such systems employ roller conveyers, turntables, wheeled carts, work benches and other special equipment to facilitate depalletizing, cutting, marking, sorting, transporting, aisle processing, and stocking operations. In some systems for retail stores, pallets are brought directly onto the selling floor and positioned at the ends of the aisles. Boxes are then transferred from such pallets to narrow wheeled carts (see U.S. Pat. Nos. 3,782,746 and 4,354,604) from which the merchandise is moved to the shelves after the conventional cutting, sorting, and marking operations. Such prior art cart systems improve productivity at the store but have no effect on the pallet system used to deliver the merchandise to the store.

For several decades it has been recognized that the postal systems in this country and other countries are inefficient and that the cost of delivering mail is excessive. Similar perplexing problems exist in connection with commercial package delivery systems. Although pallets are commonly employed in postal and package delivery systems, there was no reason to suspect that a special pallet-delivery system could solve the basic problems, particularly those of the postal system. In fact the extensive use of cheap or destructible pallets by major corporations using the postal system has created serious problems because of the unreliability of such pallets.

SUMMARY OF THE INVENTION

The present invention is a giant step forward in the field of material handling and satisfies important needs which have existed for several decades. It is particularly important in that it permits reorganization of the present postal and package delivery systems and adoption of a versatile high-speed material handling system ideally suited to rapid, efficient processing and transport of large volumes of material in the form of parcels and loose mail. The delivery system of this invention is also an outstanding advance when used in a retail store or supermarket because of the remarkable improvement in efficiency and productivity and the relatively low equipment expense.

The invention involves the use of a large number of identical compact nestable four-wheel trucks or carts which serve as pallet carriers and which can be connected together in trains by means of retractable tow bars.

In one of the preferred embodiments of the invention (see FIG. 1), a nestable four-wheel dual-function truck is provided which functions in one mode as a pallet carrier and in another mode as a platform truck for loose articles or mail sacks. The dual-function pallet-platform truck has a rigid base frame on which the wheels are mounted, a rigid upright front end frame, and a flat rectangular platform which is hinged to swing from a horizontal operating position to a vertical storage position adjacent to the front end frame. The platform is of a size to receive a standard-size 40"×48" pallet. When the truck is used as a platform truck, a removable upright rear end franme is detachably mounted on the rear of the platform. When the truck is used as a pallet carrier, the rear end frame is stored by hanging it in a vertical position against the front end frame.

The dual-function pallet-platform trucks of this invention are specially designed for use in postal or package delivery systems. In one preferred embodiment, the trucks are employed for transport of mail by bulk mail centers scattered throughout the country and permit rapid and efficient processing of letter and package mail which heretofore has never been achieved.

In another embodiment, the compact nestable trucks of this invention are used in the mercantile field in conjunction with pallet warehousing systems in which merchandise packed in boxes, cases or crates at the point of manufacture or elsewhere is delivered to and temporarily stored in a depot or warehouse on inexpensive pallets.

In accordance with the invention, loaded pallets are placed on some or all of the nestable four-wheel trucks which are transported from the depot, warehouse or mail center to the store, mail facility or receiving cengter in a large truck trailer.

A typical 40-foot trailer carries 18 loaded pallets in conventional systems using pallet jacks to move the pallets into position. Loading of the trailer may take an hour or so. With the new system the same trailer will accommodate 20 loaded pallet carriers, which can be rolled from the loading dock into the trailer in a much shorter period of time, often less than 15 minutes. The four-wheel carts or pallet carriers likewise permit unloading of the trailer in a short period of time, such as 10 to 15 minutes, when the trailer arrives at the loading dock of the receiving center or store. Movement of the pallet carriers away from the loading dock is facilitated by towing them in trains of 3 to 8 carriers.

In a postal delivery system using a dual-function truck, some of the trucks serve as platform trucks to carry the mail sacks and the others serve as pallet carriers. The truck trailer is loaded and unloaded in the same way as described in the previous paragraph with the same number of trucks or carts. The carts carrying mail sacks occupy no more space than those carrying loaded pallets.

The flat rigid metal platform of the dual-function pallet-platform truck is highly advantageous in preventing damage to weak or destructible pallets and makes it possible to minimize the cost of providing and maintaining the pallets and to avoid the problems associated with damaged pallets.

The nestable four-wheel trucks made according to the preferred embodiment of this invention are also highly advantageous when towed in a train because of their unique ability to track when turned around sharp corners. By providing a pivot at the front of each truck instead of the rear and by equalizing the spacing of wheel pairs in the train, it becomes possible to tow a train of several loaded trucks through narrow aisles in the store, warehouse, depot or distribution center.

The nesting feature is important in the delivery system of this invention and minimizes problems in storing or transporting the empty trucks or carts or in maintaining the desired distribution of the trucks at various depots or receiving locations.

An object of the invention is to provide a more economical, convenient and efficient material handling system for use in postal or package delivery or for use by commercial establishments in the processing, distribution and sale of goods and merchandise.

Another object of the invention is to provide compact nestable four-wheel trucks specially adapted to function as pallet carriers in an improved material delivery system in which palletized loads are transported by truck trailers with maximum use of trailer space and are wheeled on and off the trailer in a minimum period of time.

A still further object is to provide compact nestable trucks or pallets carriers with free-rolling running gears providing superior control and maneuverability which perform in a remarkable manner when connected together in tractor-drawn trains and towed through narrow aisles and around sharp corners.

Another object of the invention is to provide an economical, convenient and efficient material handling system which reduces the costs involved in storing palletized merchandise and moving it from the warehouse to the shelves of retail stores and which facilitates rapid and efficient order picking of packaged merchandise at the warehouse.

These and other objects, uses and advantages of the invention will become apparent from the drawings and the description which follow.

BRIEF DESCRIPTION OF THE DRAWINGS

In the drawings:

FIG. 5 is a fragmentary elevational view showing the tow bar assembly of the truck on a reduced scale with parts broken away, the tow bar being shown in broken lines in a moved position;

FIG. 6 is a fragmentary perspective view showing a portion of the assembly;

FIG. 7 is a fragmentary top view of the tow bar assembly with parts broken away;

FIG. 8 is a vertical sectional view of the assembly on a reduced scale;

FIG. 9 is a fragmentary side elevational view on a reduced scale showing the trucks connected together in a train;

FIG. 10 is a plan view showing the bottom of a pivoted platform employed in the truck of this invention;

FIG. 11 is a foreshortened vertical sectional view of the truck on a different scale with parts omitted and parts broken away.

FIG. 12 is a fragmentary elevational view showing the construction at the rear axle;

FIG. 13 is a foreshortened section view of the platform of FIG. 10 on a larger scale;

FIG. 14 is a fragmentary front elevational view showing a portion of the removable end frame;

FIG. 15 is a fragmentary sectional view;

FIG. 16 is a perspective side elevational view on a reduced scale showing a four-wheel pallet carrier made according to this invention having a pallet mounted thereon;

FIG. 17 is a perspective view of the pallet carrier on a reduced scale;

FIG. 20 is a foreshortened vertical sectional view taken on the line 20—20 of FIG. 19 and on a reduced scale with parts omitted, the rear wheels being shown in broken lines;

FIG. 21 is a fragmentary vertical sectional view taken on line 21—21 of FIG. 19;

FIG. 22 is a foreshortend front elevational view showing the pallet carrier of FIGS. 16 and 20 on a reduced scale with parts omitted; and FIG. 23 is a fragmentary front elevational view showing the end portion of the two bar and means for holding it in its vertical retracted position.

DESCRIPTION OF THE PREFERRED EMBODIMENTS

Figure 1:
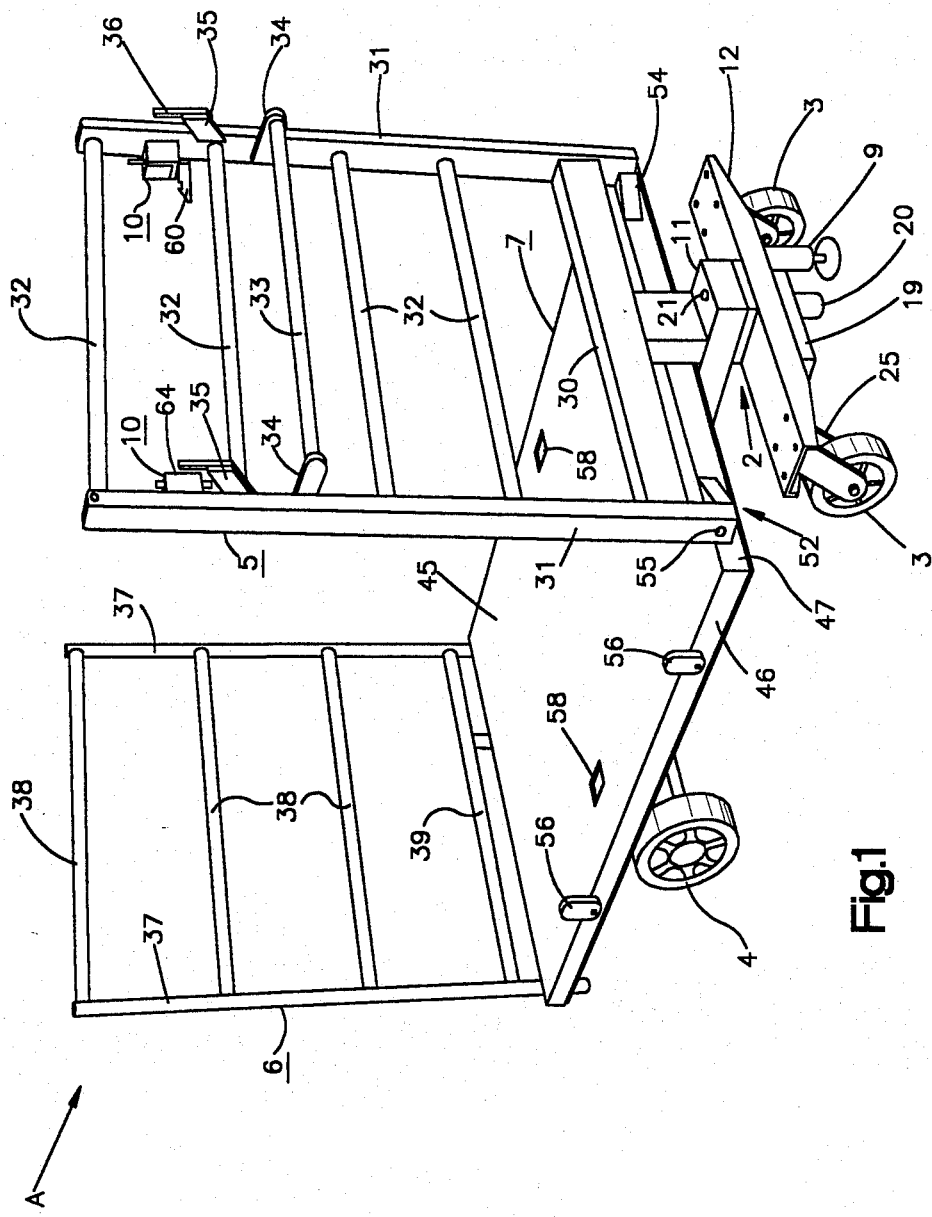
FIG. 1 is a perspective view on a reduced scale showing a nestable dual-function truck constructed according to the invention.

The invention is described in more detail in connection with two preferred embodiments. One preferred embodiment relates to postal and package delivery using compact nestable pallet-carrying carts or trucks specially designed for this prupose. Another preferred embodiment relates to versatile warehousing and processing systems for use by a supermarket or retail store using the special free-rolling nestable trucks of this invention for order picking at the warehouse, for transport and delivery from the warehouse to the retail shelves at the store, and for other sorting or processing operations.

It will be understood that the compact free-rolling trucks of this invention must be of a special design to be suitable for the unique pallet delivery systems referred to above. They must be of a size to fit standard-size pallets and of such a compact nature as to permit close nesting during storage and crosswise positioning in a truck trailer during transport. The placing of the pallet-carrying trucks in transverse rather than longitudinal positions substantially increases the number of loaded pallets in one row (e.g., from 9 to 11 or 22 percent more).

Unless the context shows otherwise, the terms used herein which are common in the material handling art have their normal meanings. The term "parcel" refers to a self-supporting unit, such as a bundle, package, box, bottle, can or barrel. The term "mail" refers to both letters and parcels. The term "platform truck" refers to an industrial truck of a type commonly used in warehouses which has a flat platform and usually upright end frames at the front and rear of the platform.

A nestable four-wheel truck or cart made according to the invention is shown in FIGS. 1 to 15 which are drawn substantially to scale. The drawings show one preferred embodiment designed for use by the U.S. Postal Service or a similar postal or parcel-delivery system wherein the truck can serve as a carrier for a loaded-pallet or as a platform truck for mail sacks and other loose articles.

The compact nestable dual-function truck or cart A shown in the drawings is preferably of heavy-duty all-steel welded construction so as to be suitable for handling heavy palletized loads weighing 2000 to 3000 pounds or more. It has a rigid base frame 2 supported on a running gear including front caster wheels 3 and rear wheels 4. The truck comprises the base frame 2, a fixed vertical front end frame 5, a removable rear end frame 6, a platform or shelf 7 pivotally connected to the end frame 5, and a retractable tow bar assembly 8 which permits a series of trucks to be connected together and towed in a train. As shown the truck also includes a foot-operated floor lock 9 at the front end and a latch assembly 10 at opposite sides of the front end frame to hold the platform in its vertical position.

The base frame 2 is constructed to facilitate nesting and comprises a main longitudinal box beam 11, a lateral front frame 12 supported on the caster wheels 3 and a lateral rear beam 13 supported by the fixed rear axle 14 and the wheels 4. The lateral beam 13 is reinforced by a spaced pair of inclined braces 15 and rigidly connected to the main beam 11 by a tubular support 16. The main beam is rigidly connected to the lateral front beam 12 by a support block 17 and is rigidly connected to the ront end frame 5 by a tubular support 18. The beam 12 is shown herein as a channel reinforced by a short channel member 19.

Various means may be provided to permit connection of several trucks in a train and connection of one truck to a conventional motorized tow tractor. An optional central towing pin 20 is carried by the base frame below the beam 19 for connection to a tow tractor. A circular pivot hole 21 may be provided for the same purpose or for connection to a tow bar. A plate 22 is preferably welded to the beam 11 to reinforce it adjacent the hole. The pivotal connection to the tow bar (65) may also be effected using a tow bar bracket, such as the bracket 22a of FIG. 9.

The running gear of the truck A is designed for free rolling with about twice as much of the load carried by the larger rear wheels 4 as by the front caster wheels. By reducing the weight carried by the conventional caster wheel assembly 24 at each end of the front beam 12, turning of the swivel members 25 at about their vertical axes is facilitated. The longitudinal spacing of the front and rear wheels and the length of the tow bars is selected to provide substantially uniform longitudinal spacing of all of the wheels when the trucks are connected together in a train. It has been discovered that this arrangement is critically important and provides precise tracking when the tow pivot is located near the line of centers of the caster wheels at the front of each truck of the train. The unique construction makes it possible for all of the trucks of the train to be towed through narrow aisles and around sharp corners. This special towing arrangement is an important feature of the invention and is quite different from conventional arrangements where the pivots are located at the rear of the truck away from the caster wheels as with the truck illustrated in FIGS. 16 to 23.

Another important feature is the ability of the truck of this invention to protect palletized loads and to transport such loads on inexpensive or destructible pallets while withstanding the drastic pounding associated with truck travel on typical roads. In this connection it is necessary to provide a rigid flat metal platform 7 capable of providing proper support for a palletized load of thousands of pounds during such truck transport. As shown herein, the entire load on the rear axle is carried on a pair of vertical support bars 26 welded to the lateral beam 13 (FIGS. 4 and 11) and an aligned pair of similar support bars 27 welded to the platform 7 (FIG. 12). A small plate 28 is welded to each bar 27 for engaging the associated bar 26 to prevent lateral movement during transport. Elastic rubber bumpers, such as the pads 29, may be provided on the main beam 11 and/or the platform 7 to provide cushioning for the unloaded platform.

As shown in FIG. 1 the front end frame 5 is of rectangular shape and is rigidly mounted in a vertical position on the main beam 11 of the base frame perpendicular to the flat upper face of the horizontal platform 7. The end frame has a horizontal box beam 30 extending laterally perpendicular to the main beam 11 and welded to the tubular support member 18. The frame has two vertical tubular side members 31 connected by four regularly spaced horizontal rungs 32 and has an optional horizontal push bar 33 carried by a pair of brackets 34. A pair of inclined hanger brackets 35 are welded to the side members 31 below the latch assemblies 10 to provide supporting means for the rear end frame 6 as described hereinafter (See FIG. 2). A vertical bar 36 is preferably welded to each bracket to prevent the frame 6 from accidentally falling off the bracket.

The removable rear frame 6 has a rectangular shape like that of the frame 5 and can be mounted in a vertical position parallel to the frame 5 when the truck is used as a platform truck to carry mail sacks, for example. The rear frame comprises a pair of vertical tubular side members 37 connected by three regularly spaced horizontal rungs 38 and a bottom tubular rung 39. The bottom rung is spaced from the bottom ends of the members 37 and is rigidly connected to a round vertical support cylinder 40 having a short horizontal stop pin 41 as shown in FIGS. 14 and 15.

The cylinder 40 is of a size to fit inside a tubular support member 42 which is rigidly connected to the rear of the platform 7 by a horizontal extension member 43 (FIG. 12). The member 42 has a generally square cross section and is open at both ends to avoid problems due to foreign matter. The pin 41 engages the top of member 42 to limit downward movement of the end frame and to support its weight. Short extension members 51 at the rear corners of the platform engage the sides of the frame to maintain the frame in a fixed position. This unique arrangement has exceptional advantages because it facilitates rapid mounting and removal of the end frame and eliminates problems due to bending or distortion of the end frame after extended use.

The extension members 51 have a short length, such as 1 inch to 4 inches, preferably such that the overall length of the truck A of FIG. 1 is no more than 54 inches.

The rigid rectangular platform 7 of the nestable 4-wheel truck A is of all-steel construction and is designed to retain its flat shape when supporting loads of several thousand pounds. The platform has a reticulate metal frame 44 which supports a flat rectangular top plate 45 formed of sheet metal and having a width of 40 inches corresponding to the width of a standard 40"×48" pallet. The length of plate 45 is 4 feet or somewhat more and is limited to permit crosswise positioning of the trucks during transport in a standard 40-foot highway truck-trailer.

The frame 44 (FIG. 10) has tubular side members 46, tubular end members 47 and a lateral support member 48 which can be positioned directly above and parallel to the rear axle 14 of the truck. The reticulate frame preferably includes at least one longitudinal member 49 and at least one lateral member 50. The extension blocks 51 are welded to the rear member 47 near the ends thereof so they are aligned with the side members 37 when the rear frame 6 is in its vertical operating position.

A pair of hinges 52 are provided for pivotally connecting the platform 7 to the front end frame 5. Each hinge includes a flat hinge plate 53 welded to the front member 47 of the frame 44 and an inclined reinforcing plate 54 (FIG. 10). Horizontal pivot pins 55 extend through the lower end portions of the side members 31 and through the holes 55a of the hinge plates to support the platform for swinging about a horizontal axis parallel to the axis of the rear axle 14.

Figure 2:
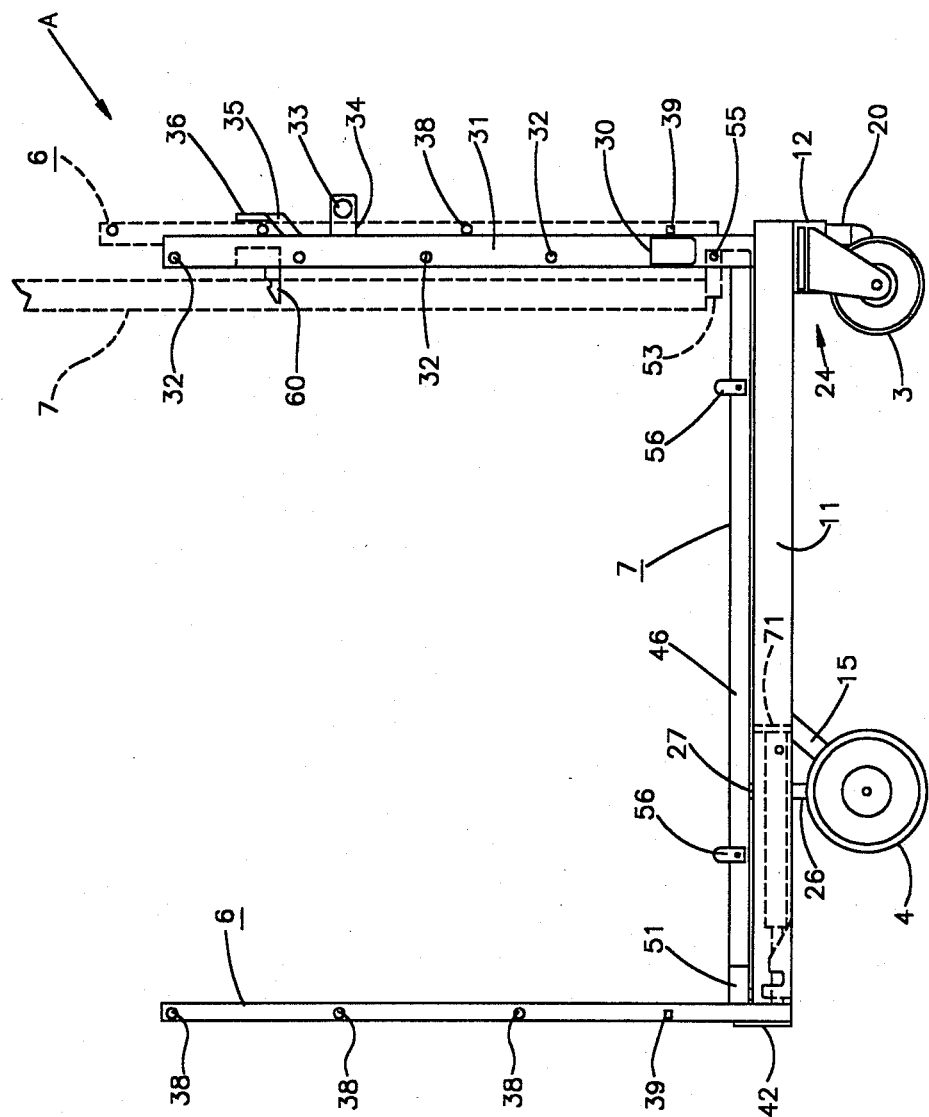
FIG. 2 is a side elevational view of the truck, the rear end frame and the pivoted platform of the truck being shown in broken lines in storage positions.

The platform 7 is movable between a lowered position (FIGS. 1 and 2) and a raised position (FIGS. 3 and 4) by pivoting the platform about the pins 55 (FIGS. 2 and 9). When the platform is in the lowered position, a flat major side surface of the plate 45 extends from a location adjacent to a forward end portion of the base frame 2 (FIG. 1) to a location adjacent to a rearward end portion of the base frame. The platform overhangs, that is, is offset rearwardly from, the rear wheels 4 (FIG. 2) so that a relatively large portion of a load on the platform is supported by the rear wheels.

Means may be provided to limit movement of a pallet as it is mounted on the platform 7 and to assist in positioning the pallet so that it is properly centered and does not overhang the sides of the platform. As shown, a number of pivoted tabs 56 are provided for this purpose which project upwardly above the top plate 45 (FIGS. 1 and 2) when the truck is used as a pallet carrier. These may be provided at one or more sides of the platform 7 and may be turned and adjusted to retracted positions below the plate 45 when the truck is used as a platform truck.

Figure 3:
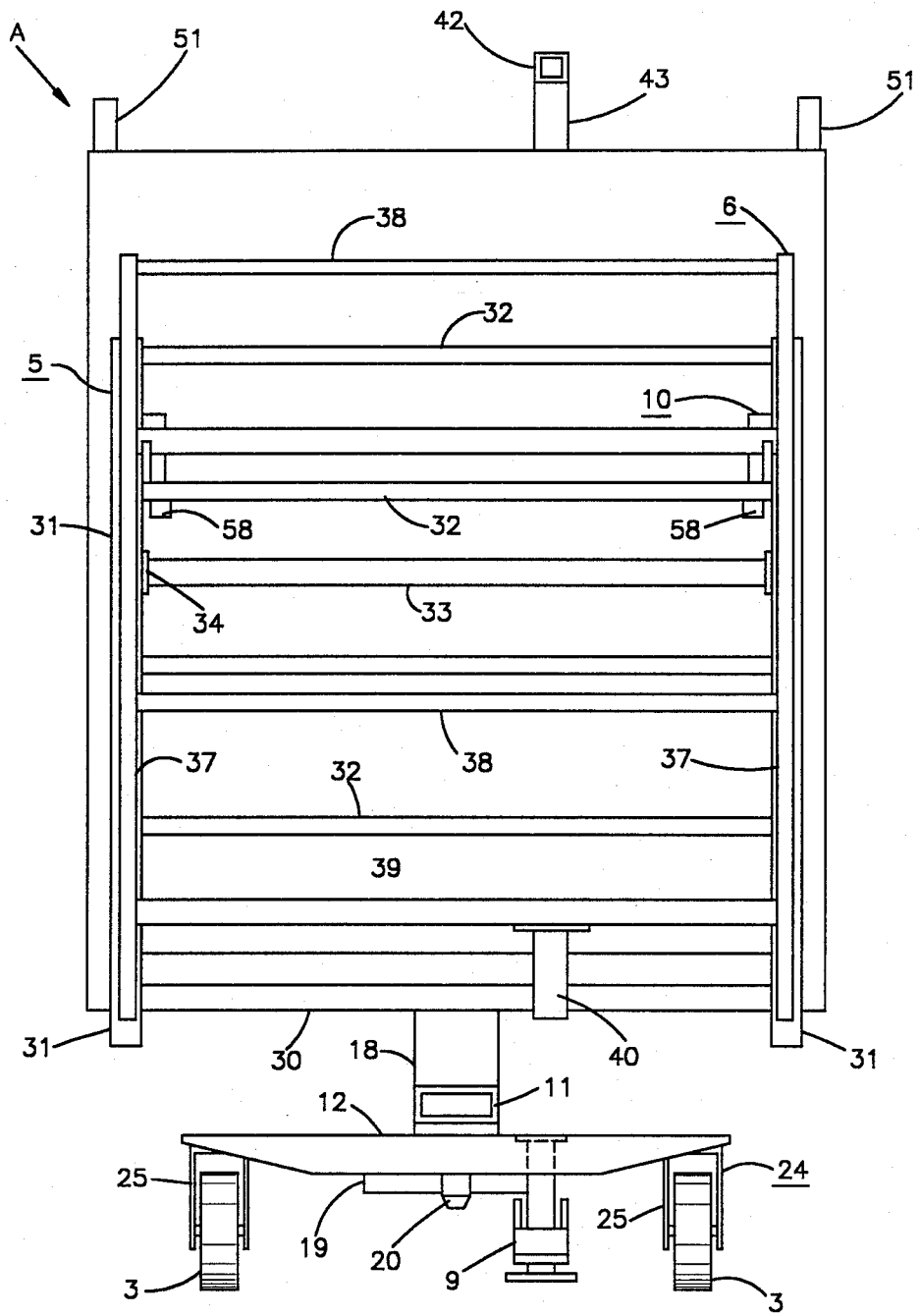
FIG. 3 is a front elevational view of the truck showing the parts in their postitions during storage.
Figure 4:
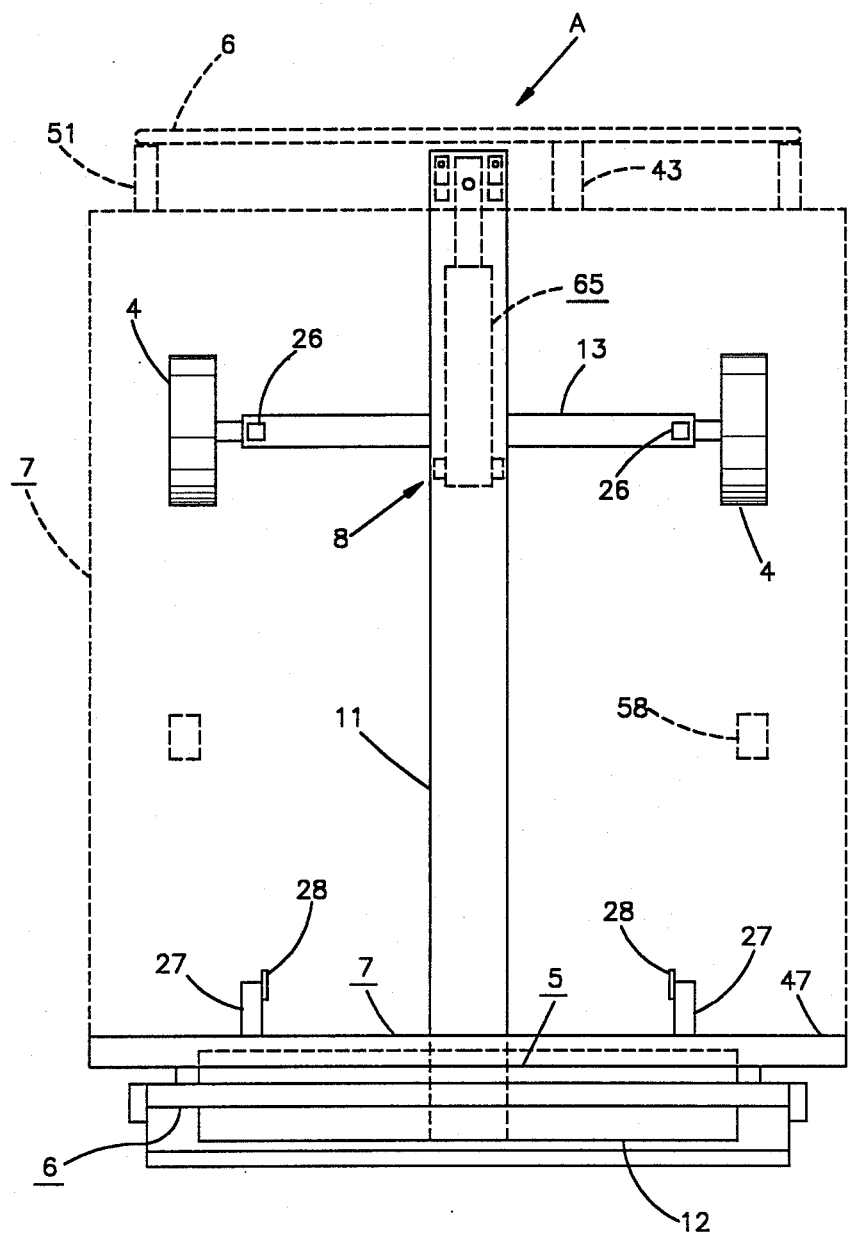
FIG. 4 is a top plan view of the truck of FIG. 3, the metal platform being shown in broken lines in its horizontal, operating position.
Figure 18:
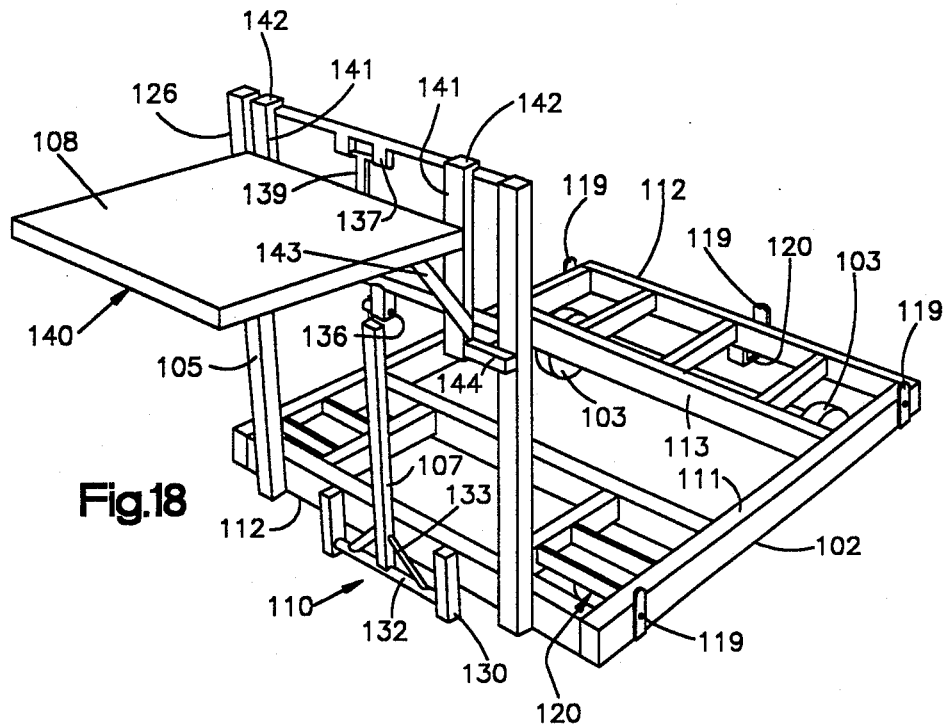
FIG. 18 is a perspective view of the pallet carrier showing shelf mounted on the upright end frame.

The top plate 45 has a pair of rectangular latch holes 58 which are aligned with the latches of the end frame 5 when the platform 7 is swung to its vertical retracted position shown in FIGS. 3 and 4. The rear edge of each hole is reinforced by a pin 59 welded to the bottom of plate 45 (FIG. 10).

Each latch assembly 10 shown herein has a latch member 60 mounted to swing about a vertical axis and adapted to move into one of the holes 58 when in a longitudinal position. The latch member has an inclined surface 61 leading to a notch 62 of a size to receive the pin 59 and the adjacent edge portion of the plate 45. The member 60 is rigidly mounted on a vertical spring-biased pivot pin 63 mounted for vertical movement in an open-ended square housing 65. As the platform 7 approaches its vertical position, the nose portion of member 60 enters the hole 58 and the pin 59 engages the inclined surface 61 to overcome the upward spring pressure and lower the latch a fraction of an inch until the pin 59 can drop into the notch 62. Normally only one latch is used to secure the platform. It is preferable to provide one at each side of the truck for convenience and to swing one latch about the axis of pin 63 to an inoperative lateral position.

The tow bar assembly 8 shown in FIGS. 2 and 5 to 7 includes a retractable tow bar 65 mounted in the rear portion of the main beam 11 which may be moved out to an operating position as shown in FIG. 5 to connect the truck A to another truck (See FIG. 9). The tow bar includes a tubular member 66 with a steel pivot pin 67 mounted at the rear end, an extension bar 68 mounted on the front end, and optional guide plates 81 (FIG. 7). A vertical pivot pin 69 is carried by the bar 68 for attaching the tow bar to another truck. The pivot pin is preferably mounted in the circular hole 21 at the front of main beam 11 as in the embodiment of FIGS. 1 and 11 but can be employed in the similar hole of a tow bar bracket 22a as in the embodiment of FIG. 9.

A pair of pivot blocks 70 are provided in the end portion of main beam 11 at opposite sides of the tow bar (FIG. 7), and a stop 71 is provided inside said beam to engage the tow bar when it is a fully retracted and entirely within the beam as shown in FIG. 2. The block 70 has a sloping guide surface 72 leading to a recess 73 of trapezoidal cross section of a size to receive the cylindrical pivot pin 67 and to maintain it in a horizontal position in the recess during towing. The reverse slopes of the recess prevent accidental upward movement of pin 67 out of the recess and eliminate the need for spring means to resist such movement.

As indicated in FIG. 6 a pair of long vertical bolts 75 extend through holes in the beam 11 at the ends of the pivot blocks 70 to limit outward movement of the pin 67 and are held in place by nuts 76. A holding pin 74 extends through similar holes 77 in the beam and through the hole 78 of the tow bar extension 68 to secure the tow bar in its retracted position. A small chain 79 is preferably provided to support the loose pin 74 when the tow bar is in use.

Whenever it is desired to connect a series of the nestable trucks A in a train, the tow bar 65 is released by removing pin 74 and is then pulled out so that pin 67 rides up over the sloping surfaces 72 of the two pivot blocks and drops into the recesses 73 as in FIGS. 5 and 7. The inclined guide members 81 at the end of tube 66 are provided to help guide the tube between the bolts 75. The horizontal pivot pin 67 permits substantial vertical swinging movement of the tow bar while preventing lateral swinging movement thereby maintaining the axis of pivot 69 and the longitudinal centerline of the tow bar substantially in a vertical plane containing the central axis of beam 11. The tow bar can swing vertically to an inclined position as indicated by the broken lines in FIG. 5 to permit towing up and down ramps or movement over inclines or uneven surfaces. The tow bar 65 which is shown herein is supported in such a way as to permit substantial vertical swinging (e.g., from 25 to 40 degrees) relative to the main beam 11.

The dual-function pallet-platform truck A of FIGS. 1 to 15 is specially designed to permit use of my revolutionary new postal delivery system and is also well suited for use in the store delivery system disclosed in my copending application Ser. No. 732,845 now abandoned. It is manifest that various features of the dual-function truck A can be advantageously included in the pallet carrier disclosed in said copending application including the improved towing system and the pivoted platform.

The embodiment of the invention disclosed in said copending application and illustrated by the pallet carrier B of FIGS. 16 to 23 is specially designed for use in supermarkets, retail stores and other mercantile establishments in the warehousing, distribution and sale of goods and merchandise. The compact nestable four-wheel trucks of my invention make it easy to wheel loaded pallets from the truck trailer at the loading dock to the aisles of the retial store and to transfer the merchandise to the retail shelves of the store without delay. My unique pallet-carrier store-delivery system retains the advantge and economics of a pallet system while providing the high labor savings and the great flexibility of a cart delivery system. My new system requires vehicles of unique construction specially made to fit standard pellets, to minimize space requirements, to permit towing in a train, to provide control and maneuverability with minimum rolling resistance, to facilitate rapid loading and strapping, and to facilitate in-store processing operations.

The truck or pallet carrier B and the associated pallet P are drawn substantially to scale in FIGS. 16 to 23 to facilitate an understanding of the invention. As shown, the pallet carrier comprises a rectangular base frame 102, which has a running gear including rear wheels 103 and front caster wheels 104, an upright front end frame 105, a gravity-drop handle bar 106, a retractable tow bar 107, and a removable horizontal shelf 108, which is supported in cantilever fashion in front of the pull handle assembly 109 and above the tow bar assembly 110.

Figure 19:
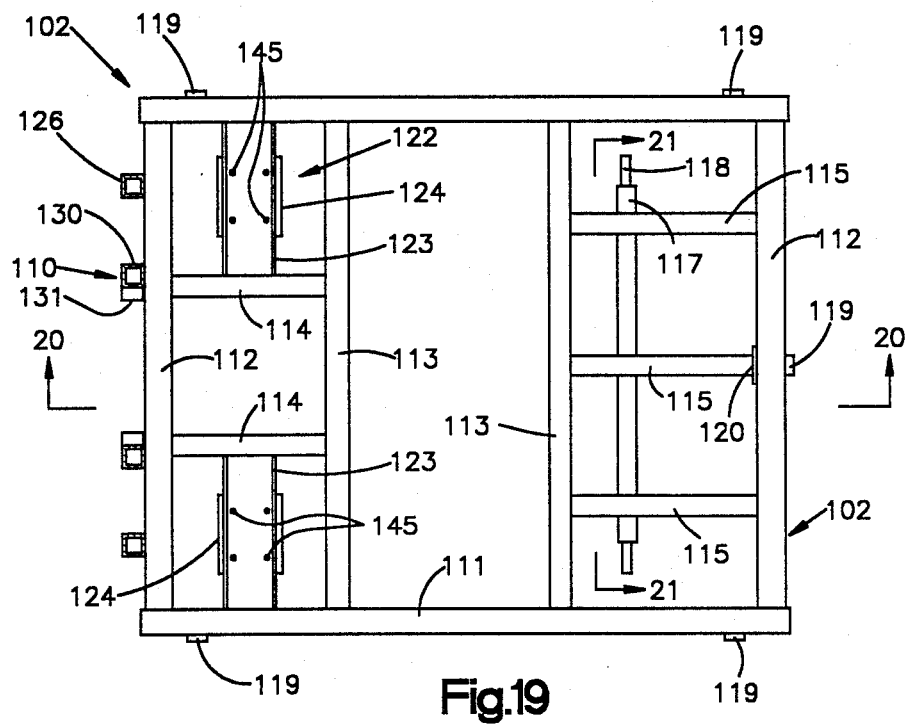
FIG. 19 is a sectional view of the pallet carrier taken on the line 19—19 of FIG. 20 and on a reduced scale with the wheels omitted.

The base frame 102 comprises a pair of tubular side beams 111 welded to a pair of tubular end beams 112 and to a pair of intermediate lateral beams 113. Longitudinal tubular supporting members 14 and 115 are provided at the front and rear of the rigid base frame 102. Three supporting members 115 are provided between the beams 112 and 113 as shown in FIG. 19. A rear axle 117 is provided having end portions 118 to receive the rear wheels 103.

As shown, a series of adjustable vertical pallet lugs 119 are mounted on the beams 111 for engaging the sides of a conventional pallet P when it is positioned on the frame 102 as indicated in FIG. 16. If desired a similar lug 119 may be mounted at the center of the rear 112.

An L-shaped towing bracket 120 is weldd to the beam 112 near the last-named lug 119 as indicated in FIG. 17 and has a horizontal portion 120a with a circular aperture 121 to receive the attaching pin 135 of the tow bar 107.

The running gear of the pallet carrier B includes a caster-wheel assembly 122 near each front corner of the frame 102 having a lateral horizontal channel 123 welded to the members 111 and 114. A pair of reinforcing side plates 124 are welded to each channel 123, and a series of mounting holes 145 are provided in the channel for mounting the conventional swivel support 125 of the caster wheel 104. The wheels 103 and 104 are mounted on double-opposed ball bearings and employ solid rubber tires of a size to facilitate free rolling. As shown herein, the carrier A employs a pair of conventional eight-inch diameter tires at the rear and a pair of conventional six-inch diameter tires at the front, the width of each tire being about 2 inches.

The front end frame is rigidly connected to the base frame 102 in a centrally located vertical position as shown in FIG. 17. The end frame comprises a pair of tubular side members 126 and a pair of horizontal rods or rungs 127 and 128. The lower end portions of the side members 126 are welded to the front beam 112. A pair of short tubular supporting members 130 are welded to the beam 112 at spaced locations to provide a rigid support for the tow-bar assembly.

Pivot bearing means 131 are carried by the members 130 to receive the opposite ends of the pivot rod 132 and to permit swinging of the tow bar 107 from its vertical retracted position to a horizontal towing position. As shown, the assembly 110 includes a pair of inclined brace members 133 welded to the pivot rod 132 and to the tow bar 107 to reinforce the same at the bottom end. The tow bar has a flat projecting portion 134 of reduced thickness at the top end which supports a cylindrical attaching member 135 of a size to fit the circular aperture 121 of the towing bracket 120 (FIG. 20).

Means are provided for locking the tow bar assembly 110 in a vertical position. Such means includes a downwardly projecting lug 129 welded to the rod 128 and a horizontal stop pin 136 extending through the lug and engaging the flat face of the end portion 134 when the tow bar is fully retracted. The tow bar is rigidly clamped in position by the beam 112 and the stop pin 136 so that further holding means are not needed.

The gravity-drop pull handle assembly 109, like the tow bar assembly 110, is normally located in the narrow space between the vertical planes containing the front and rear faces of the vertical members 126 of the end frame, which planes are spaced apart no more than 3 inches. As shown the assembly 109 includes a pair of spaced lugs 137 welded to the rod 127 and supporting a pivot rod 138 for swinging movement about its horizontal axis from a retracted position to a projecting pulling position. A short rod 139 is welded to the rod 138 and to the handle bar 6.

The end frame 105 and the retracted assembles 109 and 110 thereof are constructed to accommodate a removable shelf assembly 140 comprising a horizontal cantilever shelf 108 welded to a pair of vertical bars 141 and to a pair of inclined braces 143. The bars 141 have top hook members 142 which fit the top rod 127 of the end frame 105 to support the shelf assembly and have a pair of short stop bars 144 welded to the bars 141. The bars engage the members 126 to support the shelf 108 in cantilever fashion.

The pallet carrier B is of a size to receive a standard 40"×48" wooden pallet, such as the double-faced pallet P illustrated in FIG. 16. The pallet is of inexpensive construction and includes three longitudinal stringers 146. Optionally each stringer may be cut to provide a pair of generally rectangular recesses 147 of a size to receive the lifting forks of a conventional fork-lift truck. A series of regularly spaced flat lateral deck boards 148 are nailed to the upper sides of the three beams 146 to form a flat horizontal deck for supporting a load L. A series of flat lateral deck boards 149 are nailed to the bottom sides of the three beams 146 to reinforce the pallet.

The pallet carriers B are constructed to permit nesting of a substantial number of carriers in a small space. They may be stacked vertically or laid on their sides. When so nested, the spacing between each pair of adjacent base frames 102 is less than 6 inches.

The running gear of the pallet carrier B is constructed to provide control, maneuverability and low rolling resistance and to facilitate short radius turns during loading of the trailer. The same applies to the pallet-platform truck A of FIGS. 1 to 15. Free rolling is achieved by using double-opposed ball bearings on all wheels and by employing rear wheels 4 with a diameter of from about 8 to 10 inches so as to support the bottom of the pallet P and the upper surfaces of the beams 11 and 12 from 8 to 12 inches above the floor (preferably 8 to 9 inches). The front caster wheels 3 are smaller to facilitate turning and usually have a diameter of from 5 to 7 inches.

The rear wheels are spaced a foot or so from the rear of the truck so that the load carried by the rear wheels is about twice that carried by the caster wheels.

The nestable truck or pallet carrier B of FIGS. 16 to 23 is described in detail in my copending application Ser. No. 732,845, the entire disclosure of which is incorporated herein by reference. An important feature of the truck B and the truck A of FIGS. 1 to 15, when carrying loaded pallets, is the compact L shape provided by the narrow front vertical end frame and the horizontal base frame. The narrow cross section of the end frame 5 (FIG. 1) and the end frame 105 (FIG. 16) minimizes the overall length of the truck A or B, which can be as small as 49 to 51 inches, for example, and is usually no more than 54 inches to permit crosswise positioning in a truck trailer during transport.

In the truck B (FIG. 16) the entire end frame 5, the entire pull handle assembly 9, and the entire tow bar assembly 10, when in their normal vertical positions, are located within 3 inches of a vertical plane so that they do not project substantially beyond the load L on the pallet and do not interfere with loading of the pallet carriers into a truck trailer.

The truck A (FIG. 1) functions in a similar manner. When the truck A is used as a pallet carrier with removable end frame 6 mounted against the fixed end frame 5, the entire end frame 5 and the entire frame 6 are located within 3 inches of a vertical plane. In its vertical storage position, the entire platform 7 is located within a few inches of the frame 5 to permit close nesting. This minimizes the space required to store the trucks and makes it possible to transport 80 to 100 of the nested trucks in a standard truck trailer.

When functioning as a pallet carrier, the dual-function truck A of FIGS. 1 to 15 has the same advantage as the special pallet carrier B of FIGS. 16 to 23 for a store delivery system or warehousing system. My new pallet delivery system eliminates the inefficiency of the prior art delivery systems using pallet jacks. The special free-rolling pallet carriers of my invention facilitate movement of palletized loads without lift trucks and permit rapid loading and unloading of trailers.

Prior to this invention, the palletized loads from the warehouse were moved longitudinally into the trailer by pallet jacks or the like. Battery powered double-length pallet jacks, known as "long johns" were frequently used for this purpose.

The normal loading of loaded pallets into a standard 40-foot trailer by means of a "long john" is slow and inefficient and involves longitudinal movement of the pallets into the trailer and lengthwise positioning of the pallets so that the maximum number of pallets in each row is 9. The pallet carrier of this invention eliminates the hassle and slowness of pallet jacks and makes it possible to turn the pallets to crosswise positions inside the trailer so that the row contains 11 pallets instead of 9.

The store delivery system of the present invention is versatile and provides a substantial number of advantages as described hereinafter. The system involves a loading and delivery cycle in which pallet carriers, such as the trucks A or B, are transferred with loaded pallets from a depot or warehouse to the supermarket or retail store on a 40-foot highway truck trailer and returned to the warehouse or depot for subsequent use. In a typical operation, the trucks or carts A or B are connected in a tractor-drawn train with from 3 to 8 trucks in the train. This permits a person to traverse the train as it is moved through the warehouse or dept and to order pick the merchandise onto the pallets in a rapid and efficient manner.

The upright end frame of each pallet carrier facilitates building of a stable load on the pallet and strapping or stretch wrapping the load and can improve the load stability in transit so that larger loads can be mounted on the pallet. After the pallets of the train are fully loaded, the train is towed to a truck trailer at the loading dock of the warehouse, the tow bars are disconnected and moved to their normal retracted positions, and each pallet carrier is rolled into the trailer.

The new store delivery system permits loading of 20 trucks into a standard 40-foot trailer with a width of about 8 feet. Such loading at the depot or warehouse can be effected in a relatively short period of time, such as 10 to 15 minutes, and unloading can be effected in the same or a lesser period of time after the trailer arrives at the loading dock of the retail store.

The store delivery system of this invention reduces or eliminates the need for additional storage space at the store by facilitating the delivery of merchandise to the retail shelves. When the loaded pallet carrier leaves the trailer at the store, it may be rolled to the aisles formed between the rows of gondola shelves to unload part or all of the merchanidse after the usual sorting, cutting, pricing and/or marking operations. These operations can be facilitated by a removable stock bench mounted on the upright frame of each pallet carrier (FIG. 19) to provide a flat horizontal shelf. The store delivery system thus provides high productivity similar to that of cart systems heretofore used in some retail stores (see U.S. Pat. No. 4,354,604) and greatly lowers the cost of in-store processing and delivery of merchandise in the retail stores.

The process of this invention effects great savings for the reasons set forth above and also because of lower capital expense and more effective use of space. It is not longer necessary to provide large storage areas at the retail stores for extended storage of loaded pallets. It is more economical to store the merchandise at the warehouse until the retail store has room on its shelves for more goods.

The transfer of merchandise from the warehouse to the retail store can be facilitated by family grouping of merchandise at the warehouse. If the load on the trailer arrives at the store from a family-grouped warehouse, the pallets and pallet carriers can be wheeled directly to the aisles of the store for transfer of the merchandise to the retail shelves.

On the other hand, if the trailer load is not family grouped and the goods are randomly loaded on the pallets, the pallet carriers have even greater value in facilitating sorting of the goods and delivering them to the shelves. Also the free-rolling pallet carriers move so easily that formal sorting can be eliminated by transferring the goods to the appropriate shelf positions while moving the carriers through the aisles.

The many advantages of the versatile store delivery system described above can be obtained in other fields involving the processing, storage, distribution and delivery of large amounts of goods or merchandise. The present invention is ideally suited for parcel-delivery and postal-delivery systems.

The unique postal delivery system of the present invention makes possible a revolutionary improvement in the processing and delivery of the mail. the unique requirements of this system are admirably met by the spcial dual-function pallet-platform truck A of FIGS. 1 to 15.

While my delivery system is described in connection with normal facilities having loading docks, it will be apparent that loading and unloading of trailers in accordance with the invention can be effected rapidly without the typical loading dock by using dock levelers, mobile loading docks, lifting platforms or the like to support the loaded pallet carriers.

It will be understood that the tow bar 65 of each truck is specially designed to permit 90-degree turns when the extension 68 is pivotally connected to another truck as shown in FIG. 11. The extension projects a distance such that the sides of the main beam 11 do not prevent a right-angle turn. The special construction is important because of the need to minimize the length of each truck during transport, and it eliminates the undesirable projection caused by the tow-bar bracket 22a of FIG. 9.

Having described my invention, I claim:

1. A compact nestble four-wheel pallet truck for use in a delivery systemm in which goods are transferred from a central station or depot in a truck trailer to a branch station or receiving depot on standard-size destructible pallets, said truck having a rigid L-shaped metal framework comprising a rigid horizontal base frame and a rigid upright rectangular vertically elongated front end frame of narrow cross section, a transverse rear axle rigidly mounted on said base frame, a pair of rotatable wheels mounted at the opposite ends of said axle, a lateral support means rigidly mounted at the fronft end of said base frame, a pair of laterally spaced caster wheels pivotally mounted on said support means at opposite sides of the base frame, supporting means carried by said base frame having a rectangular shape and upper supporting surfaces for engaging the bottom of a standard-size pallet to maintain the pallet in a position adjacent said rigid end frame wherein its sides are in alignment with and contiguous to the sides of said supporting means, a retractable tow bar mounted on the base frame for movement from a normal unobstructing retracted position to a longitudinally projecting towing position wherein the tow bar is held against longitudinal movement and horizontal angular movement relative to said base frame, said retractable tow bar being mounted to move lengthwise inside the base frame at the rear of the truck from the enclosed retracted position to an extended towing position, wherein means are provided at the outer end of said tow bar for pivotally connecting the extended tow bar to another truck, means are provided for pivotally supporting the tow bar in its extended position to permit vertical angular movement while preventing longitudinal or horizontal angular movement thereof including a horizontal pivot pin at the inner end of the tow bar and a pair of pivot blocks rigidly mounted on the base frame at opposite sides of the tow bar, said blocks having aligned recesses of a size to receive the end portions of said pivot pin which are open at the top to permit the pivot pin to drop into the recesses when the tow bar is moved rearwardly from said retracted position to said extended position, whereby a series of such four-wheel pallet trucks can be connected together in a tractor-drawn train, said base frame being shaped to permit a series of such pallet trucks to be nested closely together in interfitting parallel relation with the rigid upright end frame of each truck parallel to and spaced several inches from the upright end frame of an adjacent truck.

2. A nestable pallet truck according to claim 1 wherein said tow bar is of a length such that, when pivotally connected to the front end of another such pallet truck in a train, the spacing from the rear wheels of one pallet truck to the front wheels of the next truck of the train is about the same as that for the front and rear wheels of each pallet truck, whereby the trucks follow substantially the same path when the train is pulled around sharp corners.

3. A nestable pallet-platform truck according to claim 1 wherein said supporting means comprises a rigid metal platform of rectangular shape having a width of about 40 inches and a length of about 4 feet and having a flat rectangular metal cover sheet providing a rigid support for a pallet, said platform being movable to an upright retracted storage position adjacent to said front end frame wherein the platform and the entire end frame are located within a few inches of a vertical plane, and wherein releasable means are provided for holding said platform in said retracted position.

4. A nestable fual-function pallet-platform truck according to claim 1 wherein a removable vertically elongated rectangular rear end frame prevents goods from moving off the rear of said platform, and connecting means at the rear of said platform provide a detachable connection to support the end frame with its side portions in upright positions near the rear corners of said platform, said supporting means on said front end frame secure the rear end frame in an upright storage position against the front end frame.

5. A nestable dual-function pallet-platform truck according to claim 4 wherein said base frame has a main longitudinal box beam located at the middle of the truck and extending the full length of the truck, said platform is hingedly supported at opposite sides of said front end frame to swing about an axis parallel to the rear axle from a horizontal operating position to said upright storage position, upwardly projecting supporting means are provided near the opposite ends of said rear axle to support a major portion of the load carried on said platform during transport of a loaded pallet, and means are provided at the rear of said platform for supporting said rear end frame in its upright operating position when the truck is used as a platform truck without a pallet.

6. A pallet-platform truck according to claim 5 wherein a single rigid vertical support tube is provided near the bottom of said rear end frame intermediate the sides thereof, a rigid vertical tube is rigidly mounted on the rear of said platform to receive said support tube and to provide the sole support for said rear end frame, and means are provided near the rear corners of said platform for engaging upright side portions of said rear end frame to prevent turning of said rear end frame about a vertical axis.

* * * * *

UNITED STATES PATENT AND TRADEMARK OFFICE
CERTIFICATE OF CORRECTION

PATENT NO. : 4,863,179

DATED : September 5, 1989

INVENTOR(S) : Harold Isaacs

It is certified that error appears in the above-identified patent and that said Letters Patent is hereby corrected as shown below:

Column 13, Line 66, Claim 1, change "nestble" to --nestable--

Column 13, Line 67, Claim 1, change "systemm" to --system--

Column 14, Line 9, Claim 1, change "fronft" to --front--

Column 14, Line 66, Claim 4, change "fual-function" to --dual-function--

Signed and Sealed this

Twenty-seventh Day of November, 1990

*Attest:*

HARRY F. MANBECK, JR.

*Attesting Officer*     *Commissioner of Patents and Trademarks*